April 5, 1938.  C. G. GASE  2,113,178

ANGLE CUTTER

Filed April 15, 1936

INVENTOR.
Carl G. Gase.
BY
George V. Woodling
ATTORNEY.

Patented Apr. 5, 1938

2,113,178

UNITED STATES PATENT OFFICE 2,113,178

ANGLE CUTTER

Carl G. Gase, Parma, Ohio, assignor to Weldon Tool Company, Cleveland, Ohio, a corporation of Ohio Application April 15, 1936, Serial No. 74,535

6 Claims. (Cl. 29—103)

My invention relates to cutting tools, and more particularly to angle cutting tools.

An object of my invention is to provide an angle cutter or tool having a cutting edge disposed in a spiral with a substantially constant slope throughout the length of the cutting edge.

Another object is to provide an angle cutter having a cutting edge arranged in a conical spiral about the angle cutter, said spiral being so disposed that the angle between a line coinciding with the longitudinal axis of the cutter and a line drawn tangent to the curve of the spiral is substantially constant at all points on the cutting edge.

Another object is to provide an angle cutter having a variable lead which increases as the diameter of the angle cutter increases.

Another object is to provide an angle cutter having a cutting portion of variable diameter and having a variable lead which increases in a predetermined ratio to the diameter.

Still another object is to provide an angle cutter with a cutting edge for cutting a mass, the said cutting edge being disposed at a cutting angle to the said mass, which cutting angle is uniform at all points along the said cutting edge.

A further object is to provide an angle cutter with a fillet disposed spirally along the angle cutter, the said fillet having converging sides to form a cutting edge, the converging sides being disposed at an angle to a line running through the longitudinal axis of the cutter and the cutting edge, which angle is uniform throughout the length of the fillet.

A still further object is to provide a spirally disposed cutting edge along an angle cutter and a cutting side along said cutting edge, the said cutting side being disposed substantially constant throughout its length with reference to a line passing through the longitudinal axis of the cutter and the cutting edge. Other objects and a fuller understanding may be had by referring to the following description and claims, taken in conjunction with the accompanying drawing, in which:

Figure 1:
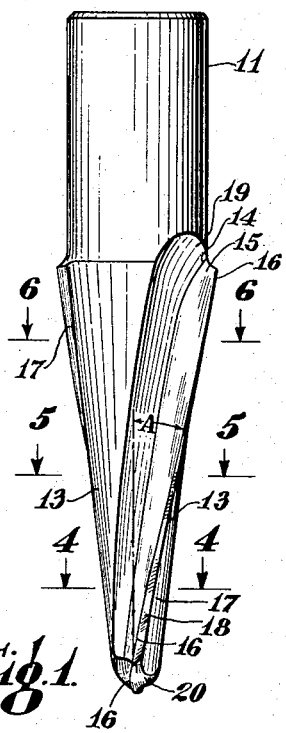
Figure 1 represents a side view of my angle cutter.

Referring to my drawing, my angle cutter has a shank or engaging portion 11 adapted to engage in the spindle of a milling machine, the flat portion 12 being for the securement of the angle cutter non-rotatively to the spindle. A cutting portion is provided on the lower end of my angle cutter, the sloping sides of this portion being represented by the character reference 13. The flutes 14 extend along this cutting portion in a spiral manner, and present spiral fillets. The wider side 19 of the flutes 14 extends to and converges with the sloping side 13. The narrow under cut or cutting sides 15 extend from the bottom of the flutes 14 to the cutting edges 16 of the spiral fillets. Extending along and from the cutting edge 16 is the cutting clearance surface 18, and sloping out to this cutting clearance surface 18 from the sloping side 13 is the side 17 of the fillet.

The spiral fillets extend outwardly from the cutting portion so that the cutting edges 16 extend out beyond the sloping side 13. At the lower end the fillets and sloping sides are rounded off to form the ball point 20.

Figure 2:
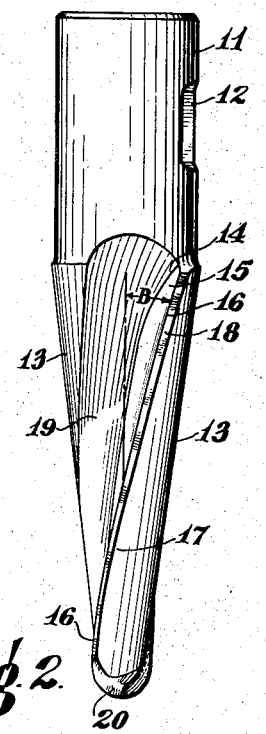
Figure 2 represents another side view of my angle cutter; the angle cutter having been somewhat rotated from the position shown in Figure 1.
Figure 3:
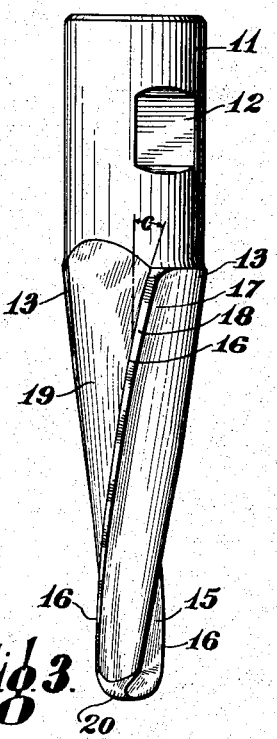
Figure 3 is another side view of my angle cutter, the angle cutter having been rotated a little further from that shown in Figure 2.

The cutting portion of my angle cutter is conical in shape, that is, it has sloping sides of increasing diameter, the greater diameter being at the upper end of the cutting portion, as shown in the drawing. These spiral fillets extend along and also rotate circumferentially of the cutting portion so that the fillets with the cutting edge extending thereon, form a conical spiral. The conical spiral is such that the included angle between a line coinciding with the longitudinal axis of the angle cutter and a line drawn tangent to the cutting edge 16 is substantially constant at all points along the cutting edge. For example, the angle A, the angle B, and the angle C shown on Figures 1, 2, and 3, respectively, representing the included angles between the line coinciding with the longitudinal axis of the cutter and lines drawn tangent to the curve of the spiral at the three designated points on the spiral, are of substantially equal value. It is also to be noted that the angle at which the cutting edge 16 meets the mass to be cut is the same at all points along the cutting edge so that the same cutting action is had at any depth to which the angle cutter is inserted into the mass.

The angle included between a line drawn tangentially to the cutting edge and a line coinciding with the longitudinal axis of the cutter is substantially equal throughout the length of the cutting edge. For purposes of definition, this characteristic will be referred to in the claims and the description as a substantially constant tangent.

Figure 4:
Figure 4 is a cross-sectional view of my angle cutter taken through the line 4—4 of Figure 1.
Figure 5:
Figure 5 is another cross-sectional view of my angle cutter taken through the line 5—5 of Figure 1.
Figure 6:
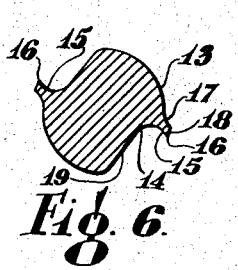
Figure 6 is another cross-sectional view of my angle cutter taken through the line 6—6 of Figure 1.

Figures 4, 5, and 6 illustrate the character of the undercut or cutting side 15, in that it is disposed substantially constant throughout its length with reference to a line passing through the longitudinal axis of the cutter and the said cutting edge. Therefore, the undercut or cutting side 15 meets the mass to be cut with the same cutting action at all depths to which the angle cutter may be inserted in the mass.

Figure 7:
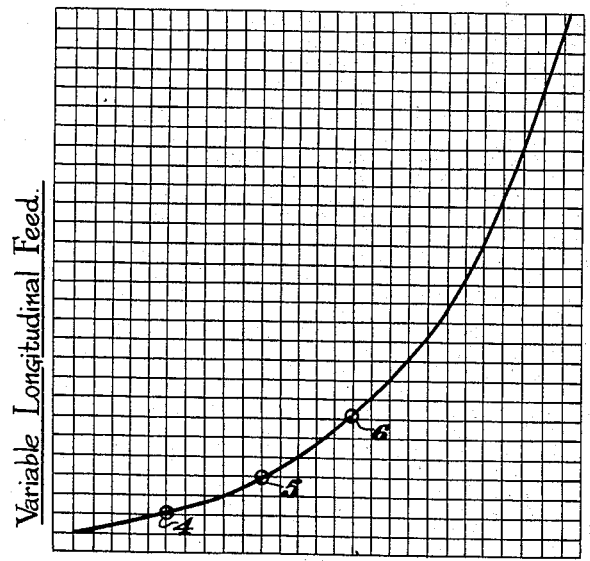
Figure 7 is a graph to illustrate the relationship of the variable feeding speed to the increasing diameter of the taper of the angle cutter.

The lead of a spirally formed cutting tool is the ratio between the distance the cutting tool is moved forward and the rotational angle through which the tool is rotated while moving the said longitudinal distance. In cutting the spiral in a tool having sloping sides and of variable diameter, the maintenance of a constant lead results in a spiral having a variable tangent and variably disposed undercut side. Figure 7 illustrates a curve of a variable lead and shows the relationship of the variable longitudinal feed to the increasing diameter of the tapered cutting tool to maintain a substantially constant tangent. In Figure 7, the ordinates represent the variable longitudinal feed, that is, the variable speed at which the tool being formed must be fed against the cutter or forming tool to maintain the necessary variable lead. The abscissa represents the increasing diameter of the tapered tool being formed. It is therefore, seen that at the smaller diameters, the feed is relatively slow, but increasingly becomes greater as the diameter increases.

For purposes of illustration, the points 4, 5, and 6 upon the curved lead line represents the variable feed at the respective diameters at the lines 4—4, 5—5, and 6—6 of Figure 1. At point 4 in Figure 7, the feed is rather low in value but as the diameter increases to point 5, the feed is increased as shown on the curve. As the diameter increases to point 6, the feed increases with greater rapidity as shown by the sharp upturn of the curve. Therefore, the greater the diameter, the faster the increase of the feed.

In order to obtain the angle cutter having the characteristics described, it is necessary to form the spiral flute and fillet so as to have a variable lead which increases with the diameter as shown in Figure 7. In forming the tool, this lead is varied and increased by the increasing of the longitudinal speed forward of the angle cutter being formed relative to the cutter or forming tool cutting the flutes and fillets.

The forming of the spiral flutes and fillets of my angle cutter may be performed in the following manner: The blank with the shank 11 and the conical cutting portion is mounted in the chuck of a milling machine. The angle cutter being formed is moved longitudinally toward a cutter or forming tool positioned for the cutting of the flutes and fillets. In order that the flutes and fillets are disposed spirally of the angle cutter being formed, the angle cutter is rotated at a constant speed as it is brought in to the cutter or forming tool. In order that my angle cutter will have the characteristics described, it is necessary to increase the speed of the longitudinal feed forward toward the cutter or forming tool as the diameter of the angle cutter being formed increases. The increase of this variable longitudinal feed forward may be governed by a cam or other suitable governing device. The increase of the speed of the variable feed forward increases greatly with the larger diameter just as is illustrated in the graph of Figure 7. My angle cutter having the described structure, has greater uniformity in operation and cuts equally well at all points along the cutting edge. The fillets and the sides having the characteristics of my angle cutter also give greater strength and stability. My tool affords uniform working conditions for the cutting edge along the entire length of the fillet.

Although I have described my invention with a certain degree of particularity, it is understood that the present disclosure has been made only by way of example and that numerous changes in the details of construction and the combination and arrangement of parts may be resorted to without departing from the spirit and the scope of the invention as hereinafter claimed.

I claim as my invention:

1. An angle cutter for a milling machine comprising, in combination, a member having a cylindrical engaging portion for engaging said milling machine and having a cone shaped cutting portion and an arcuate working end for cutting a mass at an angle to the axis of said cutting portion, a plurality of fillets integral with and extending from the said arcuate working end along said cutting portion in a conical spiral, each of said fillets having an undercut side to form a forward cutting edge extending along said fillet, the said undercut side being disposed at an angle to a line running through the axial center of said cutting portion and the said cutting edge, the said angle being substantially constant throughout the length of said fillet, the said conical spiral, beginning at the said arcuate working end, having a substantially constant tangent throughout its length so that said cutting edge cuts the said mass at the same cutting angle at all points on the cutting edge.

2. An angle cutter comprising a member having a cone shaped cutting portion and an arcuate working end, two diametrically opposed cutting edges arranged along said cutting portion in a conical spiral, said cutting portion having substantially deep flutes extending in a conical spiral along the cutting portion adjacent to said cutting edges, the said cutting edges meeting at the said arcuate working end to form a substantially continuous cutting edge, the said cutting edges being spirally disposed about the cutting portion a substantially ninety degree circumferential turn so that said flutes do not over-lap to weaken the body of said cutting portion, the said spiral of the cutting edge having a substantially constant tangent throughout its length.

3. An angle cutter for a milling machine comprising, in combination, a member having an engaging portion for engaging said milling machine and having a cone shaped cutting portion and an arcuate working end for cutting a mass, a plurality of fillets, each of said fillets extending from the said arcuate working end along said cutting portion in a conical spiral, each of said fillets having an undercut side to form a forward cutting edge along said fillet, the position of said undercut side relative to a line running through the said cutting edge and the axis of said cutting portion being substantially constant throughout the length of the fillet, the said conical spiral, beginning at the said arcuate working end, having a substantially constant tangent throughout its length so that said cutting edge of said fillet cuts the said mass at substantially the same cutting angle at all points along the cutting edge.

4. An angle cutter for a milling machine comprising, in combination, a member having an engaging portion for engaging said milling machine and having a cone shaped cutting portion and an arcuate working end for cutting a mass, a plurality of fillets, each of said fillets extending from the said arcuate working end along said cutting portion in a conical spiral, the said conical spiral, beginning at the said arcuate working end, having a substantially constant tangent throughout its length so that said cutting edge of said fillet cuts the said mass at the same cutting angle at all points along the cutting edge.

5. An angle cutter comprising a member having a cone shaped cutting portion and an arcuate working end, two diametrically opposed cutting edges arranged along said cutting portion in a conical spiral, said cutting portion having substantially deep flutes forming fillets therebetween and extending in a conical spiral along the cutting portion adjacent to said cutting edges, the said cutting edges meeting at the said arcuate working end to form a substantially continuous cutting edge, each of said cutting edges being spirally disposed about the cutting portion a substantially ninety degree circumferential turn so that said flutes do not overlap to weaken the body of said cutting portion, each of said fillets having an undercut side, the position of said undercut side relative to a line running through the said cutting edge and the axis of said cutting portion being substantially constant throughout the length of said fillet.

6. An angle cutter for a milling machine comprising, in combination, a member having an engaging portion for engaging said milling machine and having a cone shaped cutting portion and a working cutting end for cutting a mass at an angle to the axis of said cutting portion, a plurality of fillets extending, beginning at the said working cutting end, along said cutting portion in a conical spiral, the said fillets meeting at the axis of said angle cutter at the said working cutting end to form the forward portion of the working cutting end, each of said fillets having sides converging to form a cutting edge extending along said fillet, the position of one of said sides relative to a line running through the said cutting edge and the axis of said cutting portion being substantially constant substantially throughout the length of the fillet, the said conical spiral, beginning at the said working cutting end, having a substantially constant tangent substantially throughout its length so that said cutting edge of said fillet cuts the said mass at substantially the same cutting angle at substantially all points along the cutting edge.

CARL G. GASE.